(12) United States Patent
Shabat

(10) Patent No.: US 9,833,020 B2
(45) Date of Patent: Dec. 5, 2017

(54) ELECTRONIC SMOKING DEVICE

(71) Applicant: Roni Shabat, Nazareth-Illit (IL)

(72) Inventor: Roni Shabat, Nazareth-Illit (IL)

( * ) Notice: Subject to any disclaimer, the term of this patent is extended or adjusted under 35 U.S.C. 154(b) by 295 days.

(21) Appl. No.: 14/766,985

(22) PCT Filed: Feb. 12, 2014

(86) PCT No.: PCT/IL2014/050151
§ 371 (c)(1),
(2) Date: Aug. 11, 2015

(87) PCT Pub. No.: WO2014/125483
PCT Pub. Date: Aug. 21, 2014

(65) Prior Publication Data
US 2015/0366268 A1  Dec. 24, 2015

Related U.S. Application Data

(60) Provisional application No. 61/763,486, filed on Feb. 12, 2013.

(30) Foreign Application Priority Data

Oct. 16, 2013 (GB) .................................. 1318308.2

(51) Int. Cl.
*H01R 13/44* (2006.01)
*A24F 47/00* (2006.01)
*G06F 13/38* (2006.01)
*H04M 1/21* (2006.01)
*H04M 1/18* (2006.01)

(52) U.S. Cl.
CPC .......... *A24F 47/008* (2013.01); *G06F 13/382* (2013.01); *H04M 1/21* (2013.01); *H04M 1/185* (2013.01)

(58) Field of Classification Search
CPC ...... H01R 24/58; H01R 103/00; H01R 13/20; H01R 13/6276; H01T 13/04; H01T 13/05; H01T 13/06
USPC .................. 439/125–128, 346, 348, 668, 669
See application file for complete search history.

(56) References Cited

U.S. PATENT DOCUMENTS 5,582,180 A  * 12/1996  Manset .............. A61B 5/04286
  439/135
6,793,509 B2 * 9/2004  Chen .................... H01R 13/447
  439/131
6,881,578 B2 * 4/2005  Otake .............. G01N 33/48757
  204/403.02
(Continued)

FOREIGN PATENT DOCUMENTS

CN   2826858 Y   10/2006
CN   201134897 Y   10/2008
(Continued)

OTHER PUBLICATIONS

International Search Report and Written Opinion for International Application PCT/IL2014/050151, dated May 29, 2014.

*Primary Examiner* — Phuong Chi T Nguyen
(74) *Attorney, Agent, or Firm* — The Law Office of Joseph L. Felber

(57) ABSTRACT

An electronic smoking system (50) is disclose that comprises a mobile telephone (52) having a carrying case (152) and an electronic smoking apparatus (100) that fits within the carrying case.

33 Claims, 12 Drawing Sheets

(56) References Cited

U.S. PATENT DOCUMENTS

| | | | |
|---|---|---|---|
| 7,488,216 B2 * | 2/2009 | Cho | A61B 5/14532 |
| | | | 439/638 |
| 2007/0179358 A1 * | 8/2007 | Perez | G01N 33/48785 |
| | | | 600/300 |
| 2010/0120276 A1 * | 5/2010 | White | H02G 3/14 |
| | | | 439/148 |
| 2013/0220847 A1 | 8/2013 | Fisher et al. | |
| 2013/0284192 A1 | 10/2013 | Peleg et al. | |
| 2013/0319439 A1 | 12/2013 | Gorelick et al. | |
| 2013/0340775 A1 | 12/2013 | Juster et al. | |
| 2015/0364881 A1 * | 12/2015 | Van Sambeek | H01R 43/16 |
| | | | 439/669 |

FOREIGN PATENT DOCUMENTS

| | | |
|---|---|---|
| CN | 202206173 U | 4/2012 |
| CN | 203057265 U | 7/2013 |
| EP | 20110034 A1 | 10/2009 |
| KR | 20090008914 U | 9/2009 |
| KR | 20130122713 A | 11/2013 |
| TW | M441100 Y | 11/2012 |

* cited by examiner

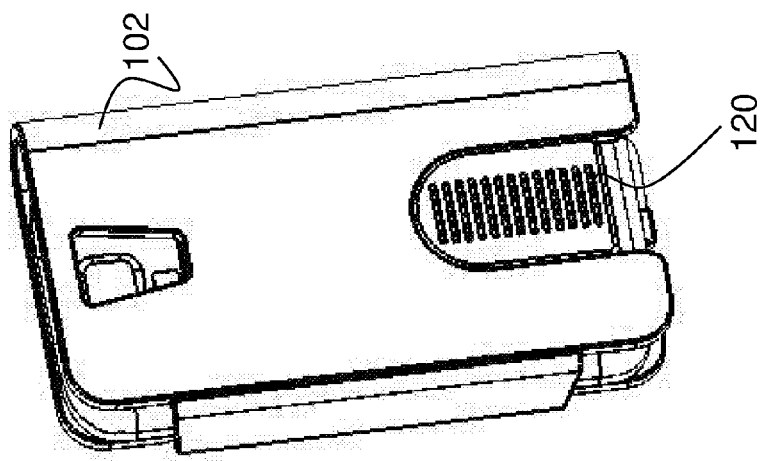
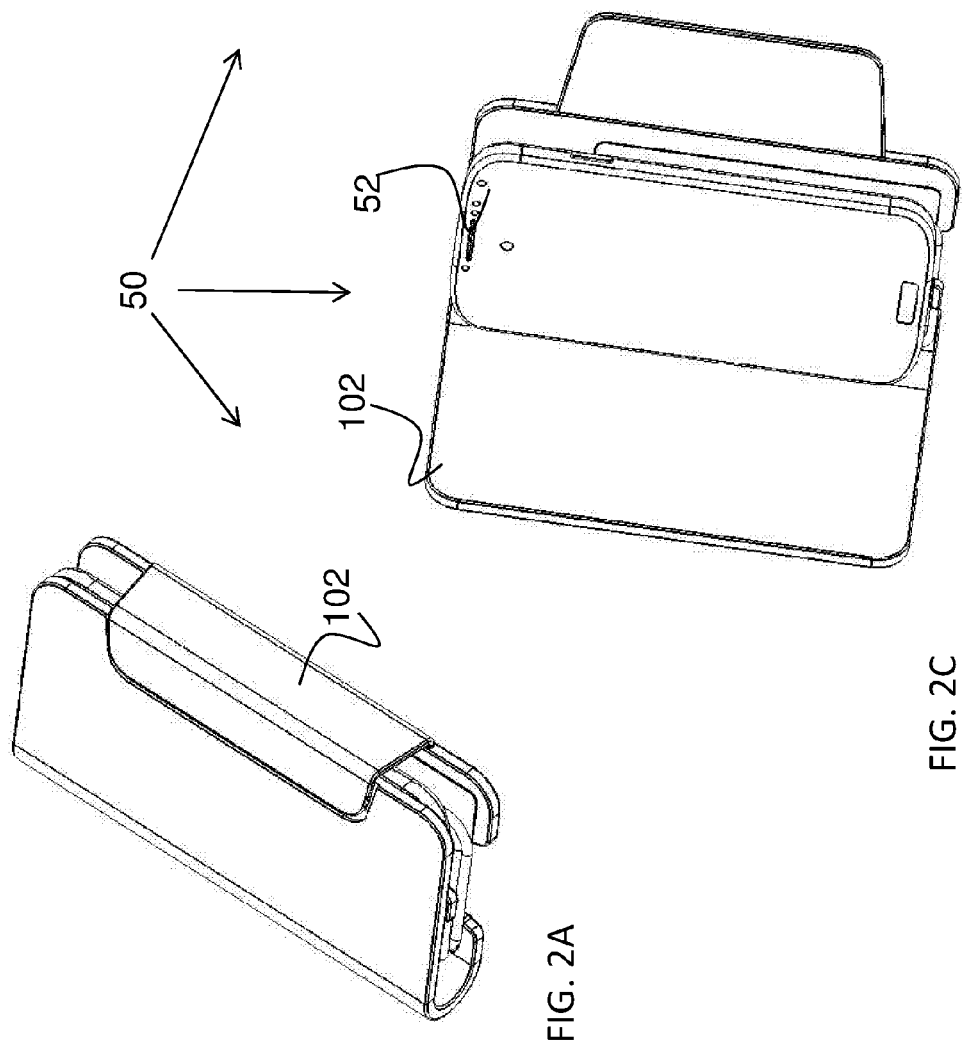

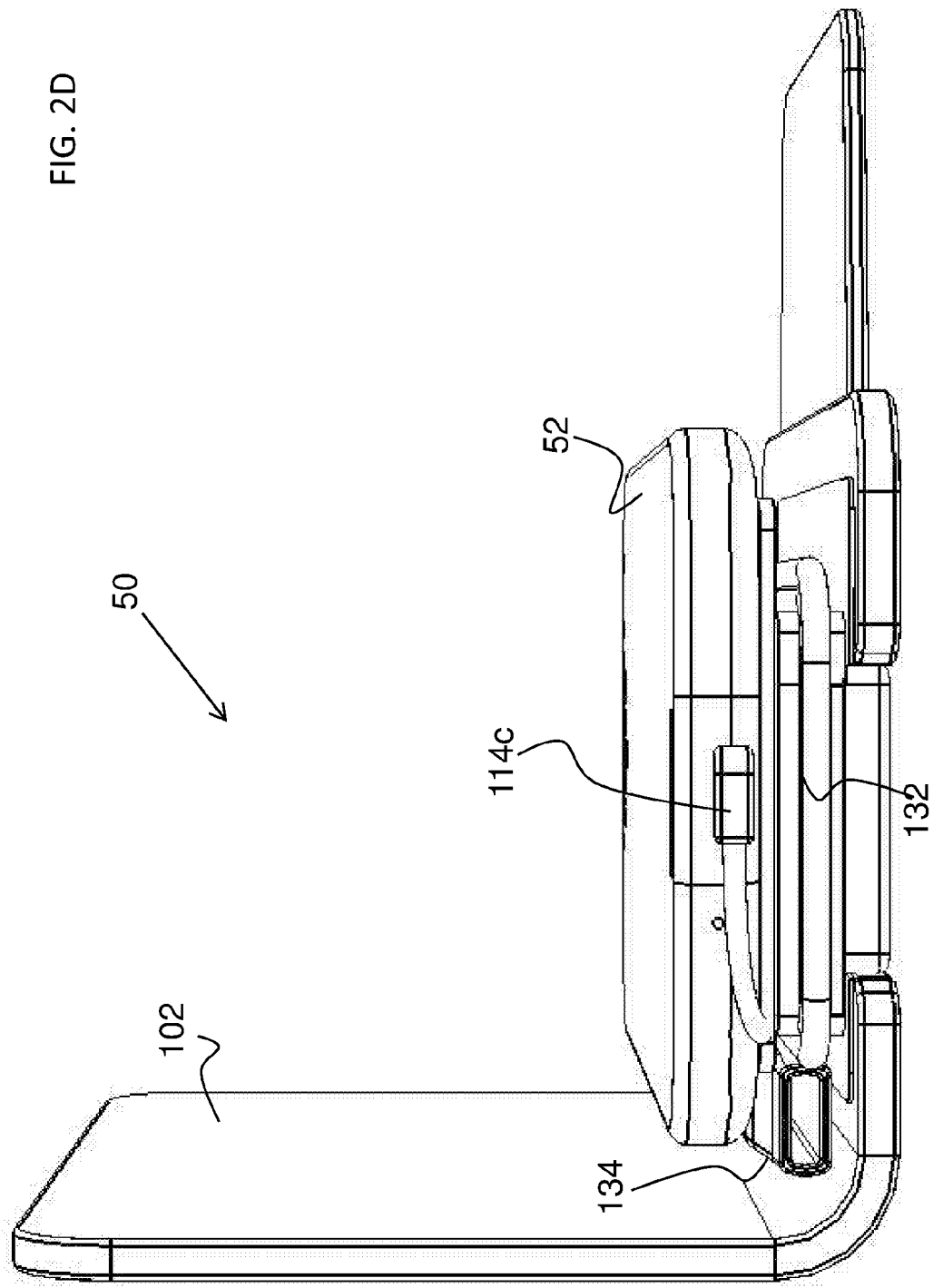

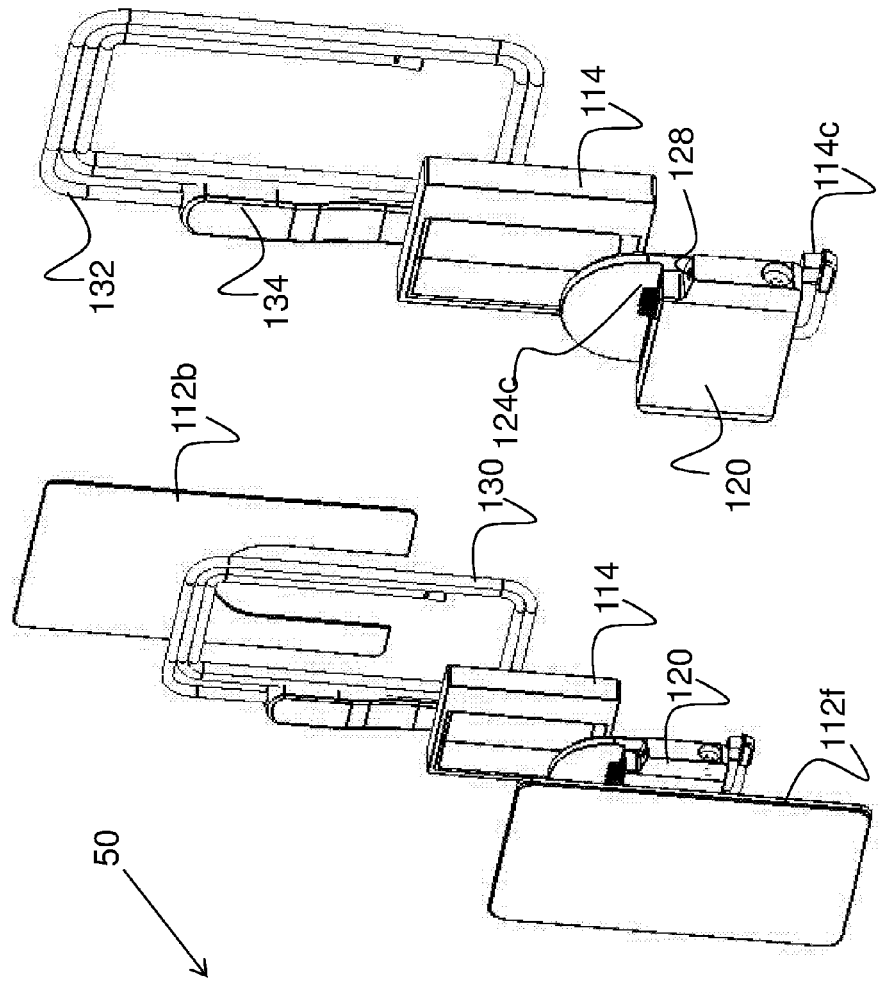
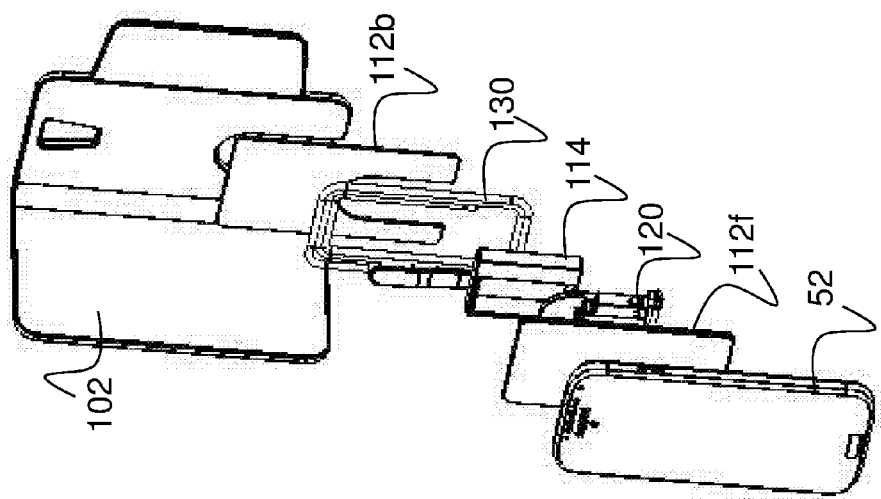

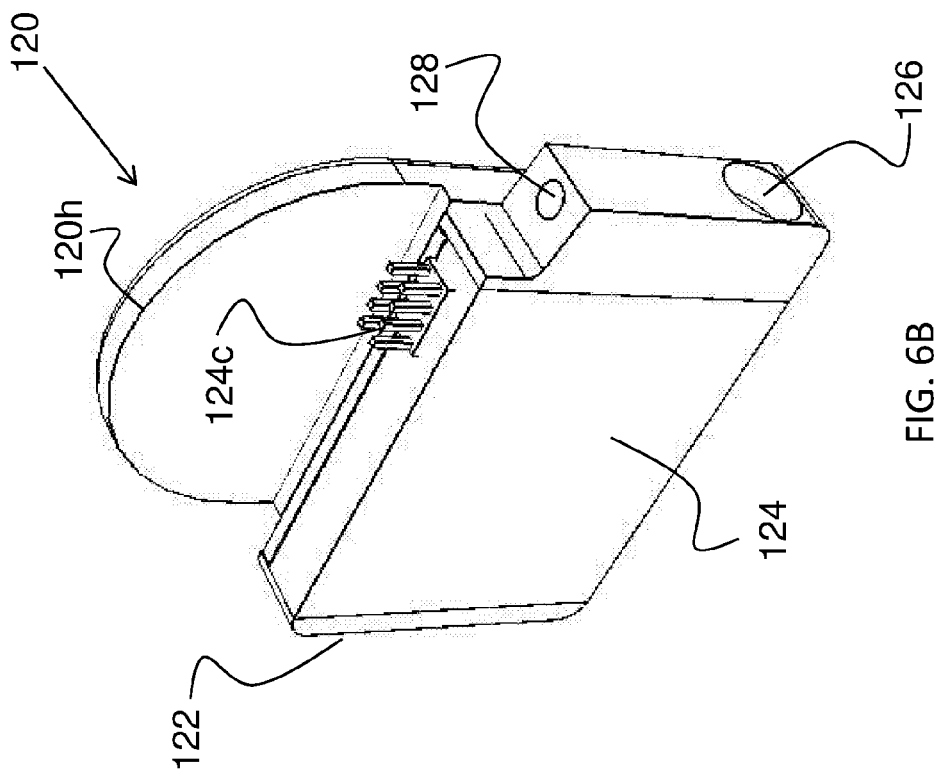
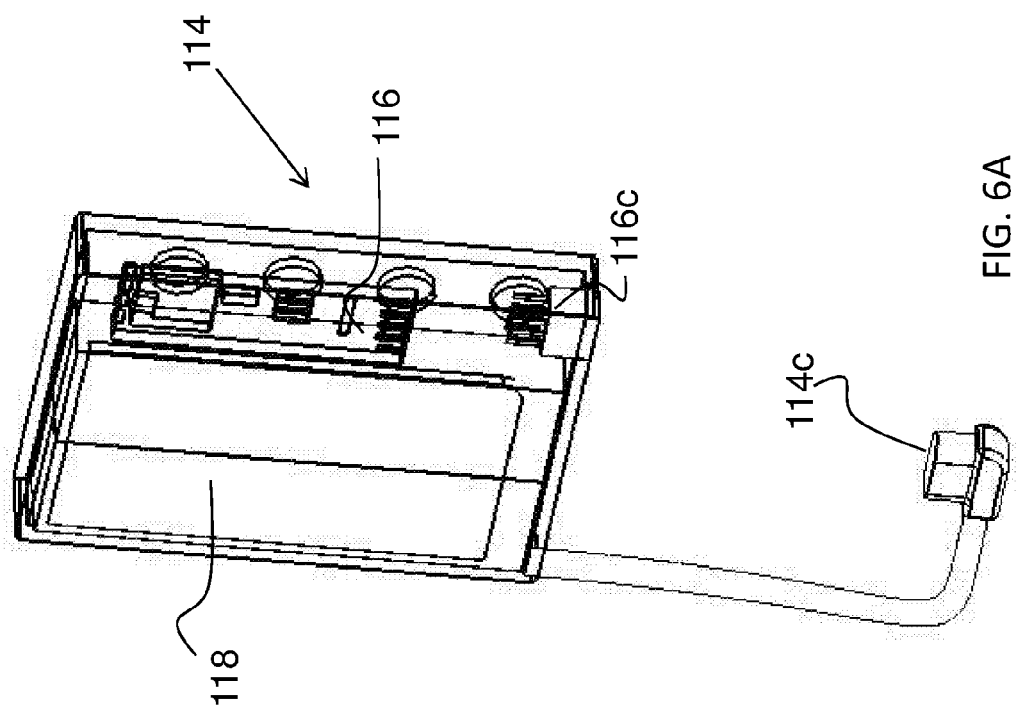
FIG. 6B
FIG. 6A

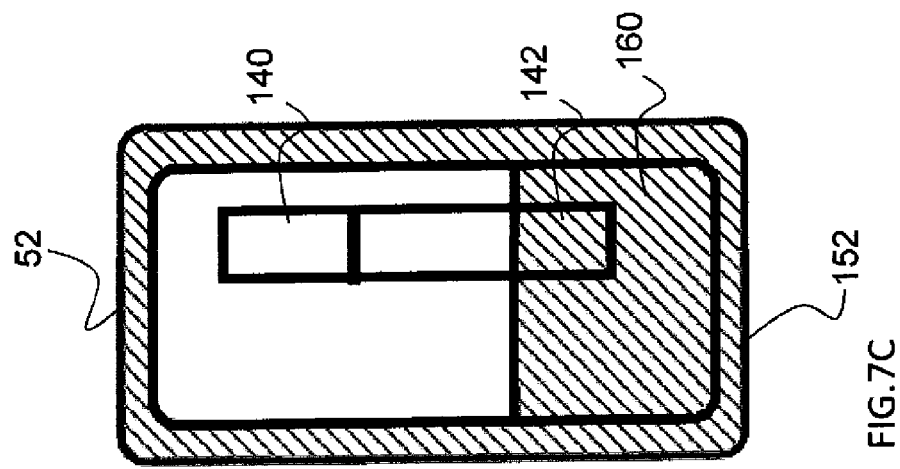
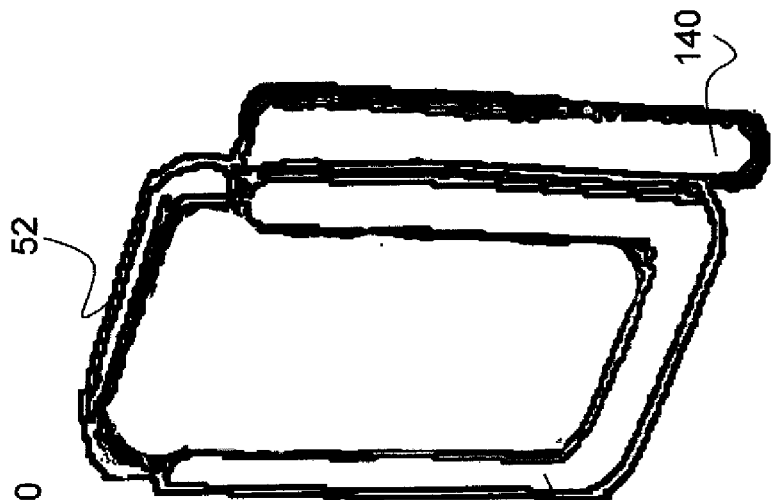
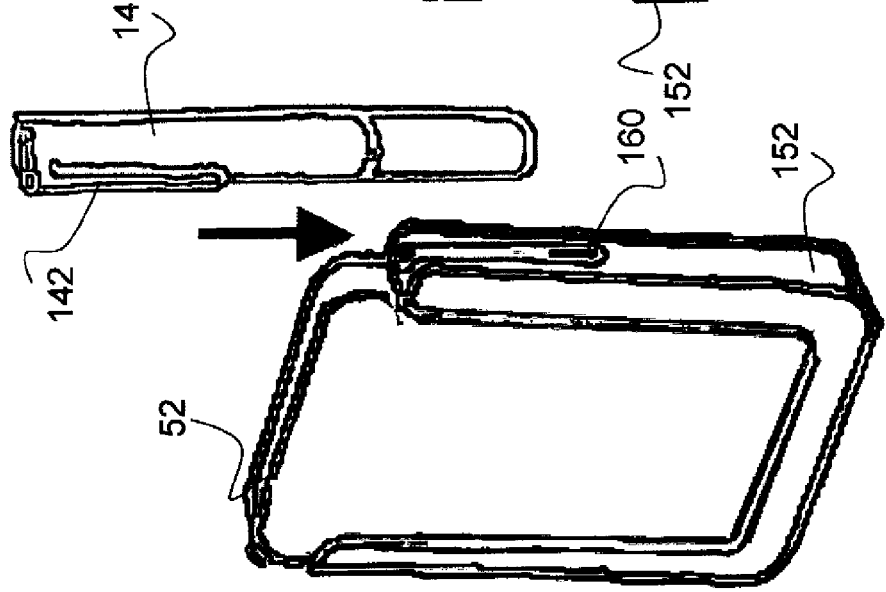

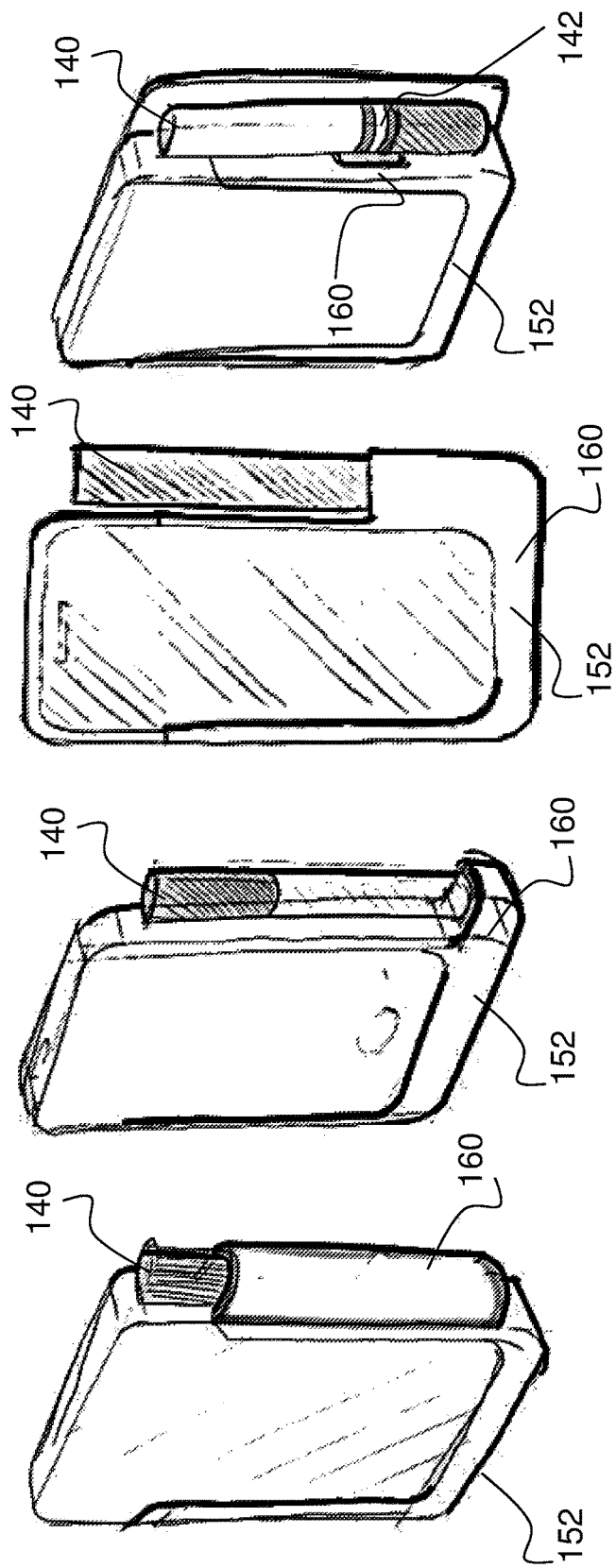

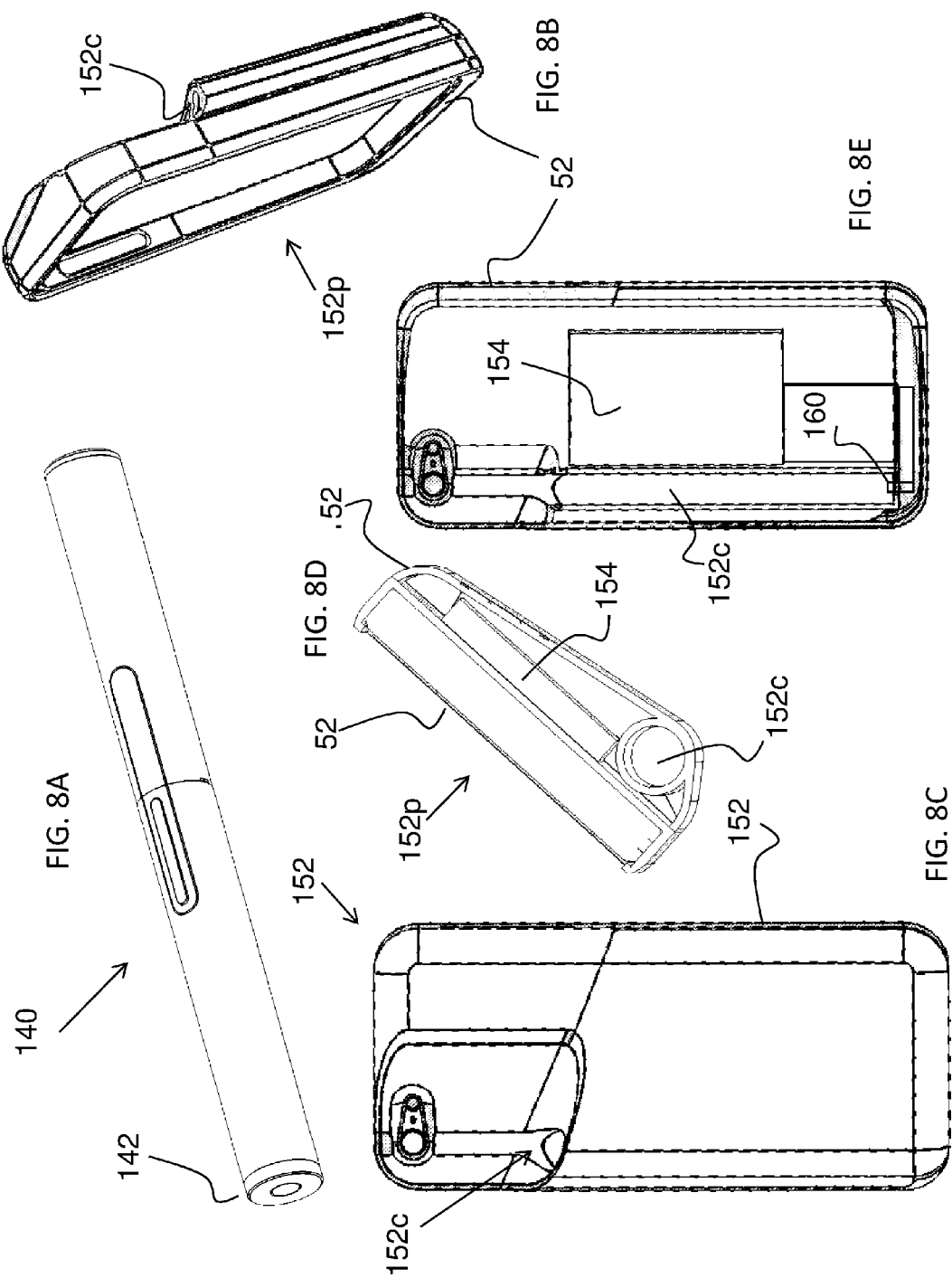

ELECTRONIC SMOKING DEVICE

This Application is a national phase of, and claims priority from, PCT Application No. PCT/IL2014/050151, filed on Feb. 12, 2014, which claims priority from U.S. Provisional Application No. 61/763,486, filed Feb. 12, 2013, and GB application 1318308.2, filed Oct. 16, 2013, which are hereby incorporated by reference as if fully set forth herein.

FIELD OF THE INVENTION

This disclosure is directed to an electronic smoking device, and particularly to an electronic smoking device that is functionally associated with a mobile telephone carrying case.

BACKGROUND OF THE INVENTION

Electronic cigarettes are a popular alternative to traditional tobacco based cigarettes that must be burned in order to generate smoke for inhalation. Electronic cigarettes provide a vapour for inhalation, but do not contain certain by-products of combustion that may be harmful to human health.

Electrically heated smoking devices are essentially aerosol-generating devices, which operate at lower temperatures than conventional lit end cigarettes. An electrical smoking device is a device in which an aerosol-forming substrate is heated by a heater element to generate an aerosol. The temperature of the heater element is controlled to be within a particular range of temperatures in order to ensure that undesirable volatile compounds are not generated and released from the substrate while other, desired volatile compounds are released.

SUMMARY OF THE INVENTION

There is an unmet need for, and it would be highly useful to have, an electronic smoking apparatus that is associated with a mobile telephone and/or communication device. Both mobile telephones and electronic cigarettes have become increasingly popular in recent years. Almost all functions of day to day activities are increasingly related to use of a mobile communication and/or telephone device. Similarly electronic cigarettes have been growing in popularity. Despite their individual popularity, a combination of mobile telephones and electronic cigarettes remains outstanding.

The present invention provides an electronic smoking system that combines the utilization of a mobile telephone with an electronic cigarette and in particular a mobile carrying case that seamlessly associates with an electronic smoking device.

An optional embodiment of the present invention provides a mobile telephone protective and/or carrying case having an integrated electronic smoking device. Optionally and preferably an integrated electronic smoking device integrated with a mobile phone carrying case further provides for the utilization of the processing powers offered by a mobile telephone and/or communication device.

Within the context of this application the term mobile carrying case may refer to any protective and/or decorative case, or cover that may be used to protect and/or cover a mobile device for example such as a mobile phone, smart phone, tablet, mini-tablet, MP3 player, iPad, iPhone, iPod, PDA (personal data assistant) music player, hand held computer or the like mobile communication and/or processing device.

Within the context of this application the term 'smoking fluid' may refer to any flowing fluid source provided in optional states and/or forms for example including but not limited to fluid, gas, liquid, power, plasma, suspension or the like. Preferably the smoking fluid may be aerosolized to generate smoke, vapour and/or the like aerosol that may be inhaled by a user. The smoking fluid source may be a medicament. The smoking fluid source may contain nicotine. The smoking fluid source may be nicotine-free.

An optional embodiments of the present invention provide an electronic smoking system comprising a mobile telephone and an electronic smoking apparatus the smoking apparatus comprising: a mobile telephone carrying case adapted to house both the mobile telephone and an electronic smoking device wherein the electronic smoking apparatus may be associated with the carrying case and wherein the mobile telephone and the electronic smoking device may be associated with one another; the smoking device comprising; a housing adapted to fit with the carrying case, electronic circuitry, a mouthpiece and a smoking tube and an atomizer, the atomizer provided for vaporizing a smoking liquid; the atomizer comprising a fluid source housing for receiving and containing at least one fluid source; at least one sensor, atomizing electronics, wherein the atomizing electronics provide for vaporizing the fluid source therein facilitating the formation of smoke from the fluid source that may be conducted via the smoking tube; wherein the atomizer may be coupled with the electronic circuitry via a connector; the atomizer comprising a smoking tube receiving port for coupling and receiving the smoking tube and mouthpiece.

Optionally the mobile telephone and the electronic smoking device may be associated by wireless means may for example include but are not limited to at least one selected from the group consisting of Wi-Fi, Radiofrequency (RF), Near Field Communication (NFC), Bluetooth, optic any combination thereof.

Optionally the mobile telephone and the electronic smoking device may be associated by wired means. Optionally the wired means may for example include but are not limited to at least one selected from the group consisting of USB port, mini-USB, or the like connector that may facilitate wired linkage between the smoking device and mobile telephone contacts between and is based on the connector available on the mobile telephone.

Optionally the association between the mobile telephone and the electronic smoking device renders the electronic smoking device functional.

Optionally the mobile telephone may control the electronic smoking device. Optionally the control may be provided via a software application (APP) running on the mobile telephone. Optionally the software application may provide for monitoring the use of the electronic smoking device and/or the consumption of a smoking fluid. Optionally the software application may provide for limiting use of the electronic smoking device.

Optionally the software application may provide for limiting use of the electronic smoking device according to a schedule.

Optionally the software application may provide for limiting the use of the electronic smoking device according to accumulated use and/or consumption of smoking fluid.

Optionally the smoking tube may be provided in the form of an elastic hollow tube having an open lumen. Optionally the smoking tube may be a telescopic hollow tube.

Optionally the smoking tube may be a retractable flexible hollow tube. Optionally, the retractable flexible hollow tube may be disposed on a return reel or snap-back reel.

Optionally the length extracted from the retractable hollow tube may be controllable.

Optionally the smoking fluid source may be provided in liquid form. Optionally the fluid source may be provided in powdered form. Optionally the fluid source may be a medicament. Optionally the fluid source may be a mixture comprising nicotine replacement agent. Optionally the fluid source may be mixture comprising nicotine. Optionally the fluid source may be mixture comprising medicinal marijuana.

Optionally the sensor may be an air flow sensor. Optionally the sensor may for example include but not limited to at least one or more selected from the group consisting of: temperature sensor, electronic resistance sensor, flow sensor, air flow sensor, the like or any combination thereof.

Optionally the fluid source may be provided in the form of a cartridge containing a smoking fluid. Optionally and preferably the cartridge may be a single use package that offers a disposable and/or replaceable smoking fluid source.

Optionally the fluid source may for example include but is not limited to be used to refill the fluid container from a central fluid source.

Optionally the power module may be integrated with the carrying case.

Optionally at least a portion of the case housing may be configured to receive and/or retain the smoking user interface comprising a mouthpiece and smoking tube. Optionally the housing may be configured to hold and/or retain the smoking tube.

An optional embodiment of the present invention provides an electronic smoking system comprising: a mobile telephone carrying case adapted to receive both an electronic cigarette and a mobile telephone; characterized in that the carrying case may be integrated with a synchronization port provided for interfacing between the electronic cigarette and the mobile telephone; the electronic cigarette including a linking port configured to seamlessly and automatically associate and align with the synchronization port.

Optionally the synchronization port and the linking port include corresponding electrical contacts that seamlessly and automatically associate with one another.

Optionally the linking port may be disposed within a housing configured to provide for seamlessly and automatically associating with the synchronization port, wherein the linking port housing may be configured to reveal and/or expose the electrical contacts and couple the contacts with corresponding contacts disposed in the synchronization port.

Optionally the synchronization port and the linking port may be provided in the form of proximity induction ports that seamlessly and automatically functionally associated with one another.

Optionally the induction ports may be configured such that the linking port may be provided in the form of male induction port and the synchronization port may be provided in the form of a corresponding female induction port.

Optionally the induction ports may be configured such that the linking port may be provided in the form of a female induction port and the synchronization port may be provided in the form of a corresponding male induction port.

Optionally the synchronization port may be provided within a specialized housing configuration that provides for associating between the electronic cigarette in a uni-directional manner, the uni-directional association provides for the automatic association of the synchronization port with the linking port.

Optionally the uni-directional association exposes and/or reveals electrical contacts on the linking port to allow for automatic coupling with corresponding electrical contacts on the synchronization port.

Optionally the synchronization port provides for interfacing data and for power sharing between the mobile telephone and the electronic cigarette. Optionally interfacing data utilizes Bluetooth communication protocol.

Optionally the port may be functionally coupled with a battery source integrated within the carrying case. Optionally the battery may be provided to replenish power of the electronic cigarette and/or the mobile telephone.

Unless otherwise defined the various embodiment of the present invention may be provided to and/or communicated to an end user in a plurality of formats, platforms, that may be outputted to at least one of a computer readable memory, computer readable device, non-transitory computer readable media, display, a computer display device, a printout, a computer, a computer on a network, flash memory, volatile memory, non-volatile memory and/or a user.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention may be described with regard to a "computer" or a "computer network", it should be noted that optionally any device featuring a data processor and/or the ability to execute one or more instructions may be described as a computer, including but not limited to a PC (personal computer), a server, a minicomputer, a cellular telephone, a smart phone, a PDA (personal data assistant), a pager. Any two or more of such devices in communication with each other, and/or any computer in communication with any other computer may optionally comprise a "computer network".

Embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers or oscilloscopes. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, non-volatile computer readable media, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

Importantly, this Summary may not be reflective of or correlate to the inventions protected by the claims in this or continuation/divisional applications hereof. Even where this Summary is reflective of or correlates to the inventions protected by the claims hereof, this Summary may not be exhaustive of the scope of the present inventions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2A-D are schematic illustrative diagrams, showing various views of an optional electronic smoking system according to the present invention;

FIG. 3A-C are schematic exploded views of an optional electronic smoking system, shown in FIG. 2, according to the present invention;

FIG. 6A-B are schematic illustrative diagrams of a portion of an optional system according to the present invention;

FIG. 7A-G are schematic illustrative diagrams of an optional electronic smoking system according to an optional embodiment of the present invention; and FIG. 8A-E are schematic illustrative diagrams of an optional electronic smoking system according to an optional embodiment of the present invention.

DESCRIPTION OF THE PREFERRED EMBODIMENTS

The present invention provides an electronic smoking system that combines the utilization of a mobile telephone with an electronic cigarette and in particular a mobile carrying case that seamlessly associates with an electronic smoking device.

An optional embodiment of the present invention provides a mobile telephone protective and/or carrying case having an integrated electronic smoking device. Optionally and preferably an integrated electronic smoking device integrated with a mobile phone carrying case further provides for the utilization of the processing powers offered by a mobile telephone and/or communication device.

The principles and operation of the present invention may be better understood with reference to the drawings and the accompanying description.

The following figure reference labels are used throughout the description to refer to similarly functioning components are used throughout the specification hereinbelow.

Figure 1A:
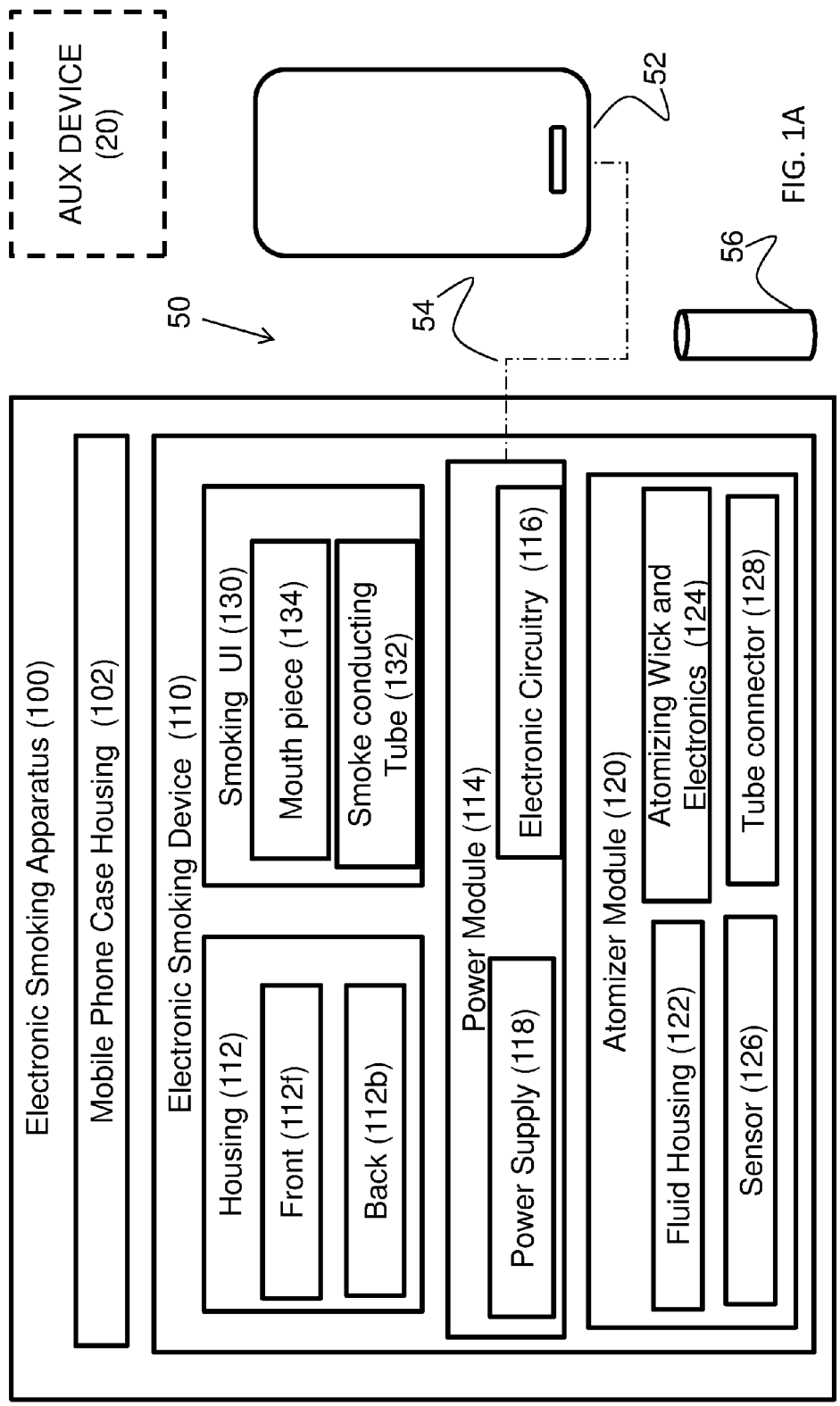
FIG. 1A-C show schematic block diagram of optional configuration of the electronic smoking system according to the present invention.

20 auxiliary device;
50, 60 electronic smoking system;
52 mobile telephone;
54 coupling;
56 replaceable smoking fluid source;
100 electronic smoking apparatus;
102 mobile phone case;
110 electronic smoking device;
112 housing;
112$b$ housing back member;
112$f$ housing front member;
114 power module;
114$c$ connector;
116 electronic circuitry;
116$c$ connector;
118 power supply;
120 atomizer module;
120$h$ atomizer housing;
122 smoking fluid housing;
124 atomizing wick and electronics;
124$c$ atomizing connector;
126 sensor;
128 smoking tube connector;
130 smoking user interface module;
132 smoke conducting tube;
134 mouth piece;
140 electronic cigarette;
142 cigarette linking port;
142$c$ electronic contacts;
142$e$ electronic circuitry;
142$h$ linking port housing;
144 communication;
146 communication;
150 electronic smoking system;
152 mobile telephone case;
152$c$ back recess;
152$p$ front recess;
154 power module;
156 electronic circuitry;
158 power supply;
160 synchronization port;
162 communication module;

FIG. 1A shows electronic smoking system 50 comprising mobile communication device 52 and electronic smoking apparatus 100. Mobile communication device 52 may for example be provided in the form of a mobile telephone, smart phone, tablet, min-tablet, PDA or the like mobile devices that provide processing, displaying and human interfacing capabilities. Mobile device 52 optionally and preferably provides communication capabilities. Most preferably mobile communication device 52 is of the form that is readily mobile and may be associated and/or housed with a carrying case 102 that may optionally be decorative and/or protective in nature.

Optionally and preferably mobile communication device 52 may provide a user with an interface platform that facilitates the use and control of electronic smoking apparatus 100. Most preferably device 52 and smoking apparatus 100 are in communication with one another as shown with coupling and communication lines 54.

Optionally communication lines 54 may be provided in the form of wired and/or wireless communication. Optionally wired communication and interfacing between device 52 and apparatus 100 may be facilitated with wired connectors, for example connector 114c depicted in FIG. 4-5. Optionally wireless communication between device 52 and apparatus 100 may be facilitated with wireless communication hardware, receiver/transceiver, and corresponding protocols disposed in each of device 52 and apparatus 100. Wireless communication may be provided in optional forms as is known in the art for example including but not limited to Wi-Fi, Bluetooth, Radio Frequency (RF), Near Filed Communication (NFC), proximity communication, optical communication, Infrared (IR), optical communication, ultrasound, any combination thereof or the like.

Optionally mobile communication device 52 may facilitate the use and control of electronic smoking apparatus 100 for example with a dedicated software application ('APP') running on device 52 that provides for operating and controlling smoking apparatus 100. Optionally such a dedicated APP provides for a plurality of optional activities associated with apparatus 100 for example including but not limited to: gauging use of apparatus 100, controlling functions of apparatus 100, interfacing and/communicating with a dedicated social network relating to the use of apparatus 100, interfacing and/or communicating with optional social networks information relating to a user using apparatus 100, gauging consumption of goods associated with apparatus 100, limiting the use of apparatus 100, time based activation of apparatus 100, remote controlling of apparatus 100 with an optional auxiliary devices 20 in communication with device 52, any combination thereof or the like.

Optionally device 52 may be in communication with an optional remote auxiliary device 20 provided for controlling functions associated with electronic smoking apparatus 100 associated with mobile communication device 52. Optionally auxiliary device 20 may be provided to limit and/or gauge and/or set a limit for the use of apparatus 100 and/or a smoking liquid associated with device 100 via mobile communication device 52. Optionally auxiliary device may 20 may communicate with and/or directly control electronic smoking apparatus 100 or any portions thereof.

Optionally auxiliary device 20 may be provided in the form of a server, computer, computer on a network, cloud computing facilities, or the like.

Optionally auxiliary device 20 may be a device associated with or form a part of a healthcare provider, individual and/or organization for example including but not limited to a health care giver, health maintenance organization (HMO), hospital, healthcare organization, pharmacist, clinic, nursing station, physician, rehabilitation services, addiction centres, rehabilitation clinic, emergency care provides, ambulatory care providers, healthcare call centres, regulatory centres, government regulatory centres, CDC, FDA, or the like.

Optionally auxiliary device 20 or a portion thereof may be utilized as an authentication server to authenticate a user attempting to use smoking device 100. Optionally and preferably authentication with auxiliary device 20 may be facilitated and/or controlled by an individual. Optionally user authentication may be facilitated with auxiliary device 20 and may be performed via mobile communication device 52 utilizing at least one or more authentication methods for example including but not limited to username and password, biometric analysis, facial recognition, iris scan, fingerprint scan, voice recognition, the like or any combination thereof. For example, an auxiliary system 20 for example in the form of a regulatory body and/or government body, may comprise and/or utilize, a user authentication system via mobile phone 52 to grant a user permission to use smoking device 110 particularly when use of smoking device 110 is utilized for medicinal purposes using a medicinal smoking fluid for example using prescribed medical marijuana or the like medicinal smoking fluid, wherein most preferably authentication is required prior to consumption of the smoking fluid with smoking device 110. Optionally and preferably authentication via mobile phone 52 may be facilitated by utilizing internal functions of the phone 52 for example including but not limited to camera, microphone, touchscreen, display, scanning pad, speakers or the like.

Optionally authentication for use of smoking device 110 may be required only with particular smoking fluids, for example those requiring a prescription such as medical marijuana, once associated with smoking device 110. Optionally a smoking liquid contained within a container 56 may be equipped with identification, for example provided in the form selected from a chip, barcode, RFID, coded switch configuration or the like, where the identification may be read with apparatus 100 to trigger the authentication process utilizing auxiliary device 20 with the aid of the mobile device 52.

Optionally auxiliary device 20 may be a device associated with or form a part of a manufacturing organization and/or provider associated with the production and distribution of optional smoking fluids.

Electronic smoking apparatus 100 includes a mobile phone carrying case 102 and electronic smoking device 110. Most preferably smoking apparatus 100 renders mobile phone carrying case 102 an electronic smoking apparatus by virtue of housing and/or integrating with an electronic smoking device 110.

Figure 1B:
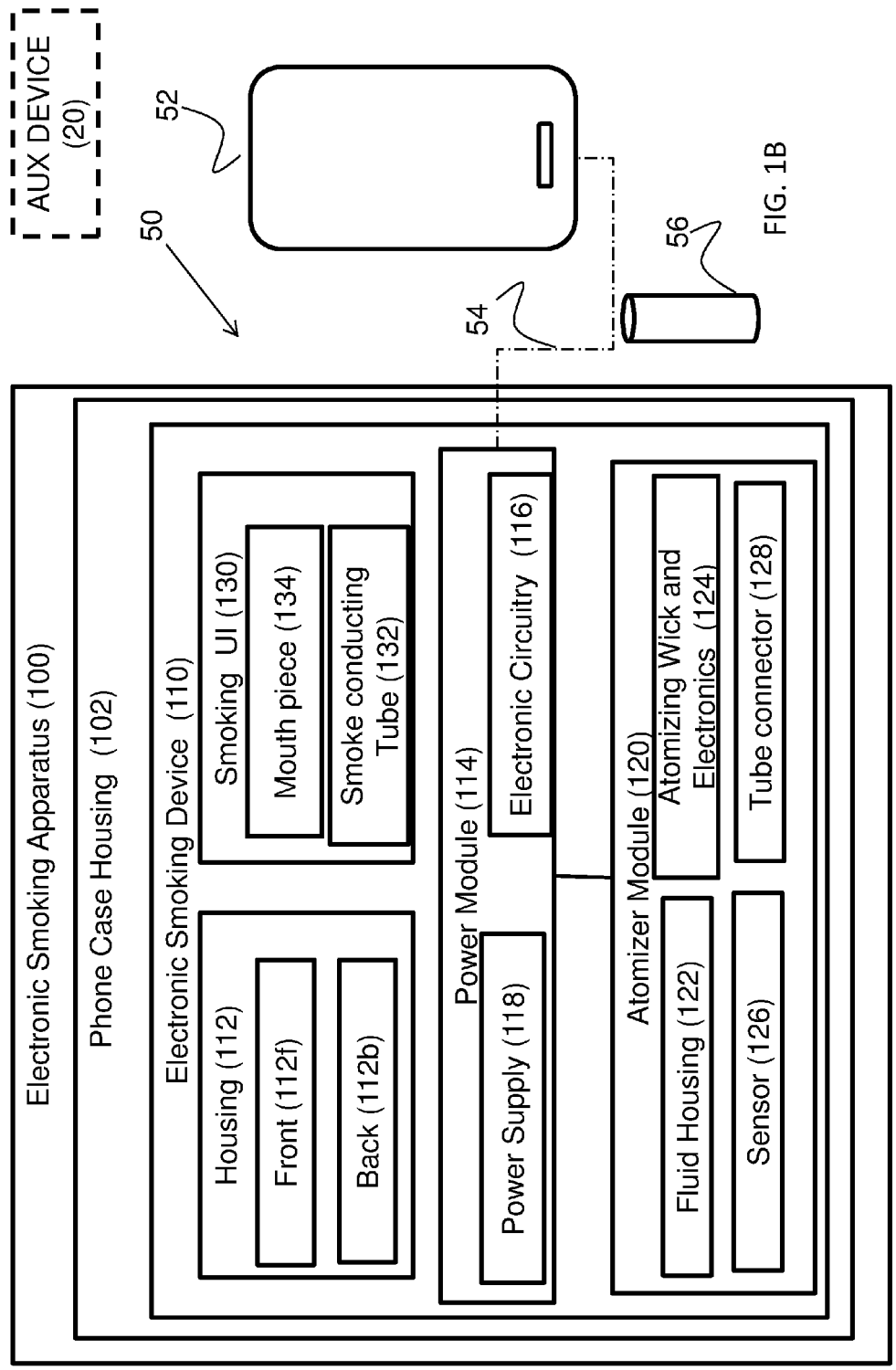

Phone carrying case 102 is provided for housing, coupling, receiving and/or holding both a mobile device 52 and an electronic smoking device 110. FIG. 1A and FIG. 1B show optional configurations of electronic smoking apparatus 100 where case 102 may optionally be integrated with at least a portion of device 110, as shown in FIG. 1B. Optionally as shown in FIG. 1A case 102 may be provided a permanent housing and/or retainer for device 110, for example in the form of a dedicated recess and/or housing, however, not integrating portion of smoking device 110 into the case 102 itself.

Electronic smoking device 110 comprises a housing 112, power module 114, atomizer module 120, and smoking user interface (UI) 130.

Optionally housing 112 may comprise at least two or more members for example including but not limited to a front housing member 112f and a back housing member 112b. Optionally back housing member 112b may provide for associating with and/or coupling with case 102. Optionally and preferably at least a portion of case 102, for example back surface, may be provided with a recess for receiving and securely coupling with back housing member 112b. Optionally at least a portion of case 102 and/or a surface of case 102 may be provided with a recess for receiving and securely coupling with front housing member 112f.

Optionally and preferably housing 112 may be provided to receive, retain and/or associate with smoking user interface 130.

Power module 114 preferably provides the electronics and power means for rendering electronic smoking device 110 functional. Power module 114 comprises electronic circuitry 116 and power supply 118. Optionally electronic circuitry 116 may be provided in the form of a PCB board and/or the like circuitry to render device 110 functional.

Circuitry 116 may be provided with communication capabilities, for example to include a receiver/transmitter (Rx/Tx) circuitry, to enable device 110 with optional communication capabilities. Optionally circuitry 116 may provide for optional communication capabilities for example including but not limited to contactless, wireless, wired, communication, as is known in the art for example Bluetooth, NFC, RF, or the like.

Circuitry 116 may be provided with a microprocessor and/or controller to control functioning of device 110. Optionally circuitry 116 may be associated with and/or in communication with mobile phone 52 in a master/slave relationship. Preferably mobile device 52 is defined as master when associated and/or in communication with device 110 which is defined as a slave.

Preferably circuitry 116 provides for controlling power supply 118. Preferably power supply is provided in the form of at least one or more battery. Optionally power supply 118 may be provided in the form of a rechargeable battery as is known in the art. Optionally for power supply 118 may be provided in the form of a capacitor, super-capacitor or the like power storing device.

Optionally and preferably power module 114 may be coupled to mobile device 52 so as to allow for power sharing and recharging power supply 116. Preferably coupling between module 116 and mobile device 52 is facilitated with a connector 114c adapted to couple with a coupling connector interface and/or jack provided on mobile device 52 for example in the form of a USB, minUSB, RTS, or the like connectors.

Most preferably power module 114 provides for rendering atomizer module 120 functional. Preferably power module 114 may be coupled with atomizer module 120 via dedicated male to female electrical connectors disposed on each module 116c disposed on power module 114 and 124c disposed on atomizer module 120. Optionally and preferably connectors 116c and 124c may be readily associated and/or disassociated with one another.

Atomizer module 120 provides the smoking functionality of smoking device 110. Preferably atomizer module 120 comprises fluid housing 122, atomizing wick and electronics 124, sensor 126 and smoking tube connector 128. Most preferably fluid housing 122 is a housing provided for receiving a smoking fluid, that may be aerosolized with atomizing wick and electronics 124 to generate smoke. Smoking fluid housing 122 may be provided as a container adapted to receive at least one smoking fluid in fluid form, or optionally a plurality of smoking fluids to form a smoking fluid mixture. Optionally fluid housing 122 may be provided to receive a primary smoking fluid source and a secondary smoking fluid source that may be controllably mixed.

Optionally may be provided as a housing adapted to receive a smoking fluid in pre-packaged cartridge forms 56 that may be readily replaced. Optionally housing 122 may be configured to receive at least one or more smoking fluid cartridge 56. Optionally housing 122 may be configured to receive a plurality of smoking fluid cartridges 56 to form a smoking fluid mixture. Optionally cartridges 56 may be configured to be a single use or limited use device. Optionally cartridge 56 may be configured to be a multi-use cartridge that may be re-filled from a central smoking fluid source.

Optionally and preferably fluid housing 122 and atomizing wick and electronics 124 are in fluid communication with one another so as to provide for a smoking fluid in housing 122 to come into contact with at least a portion of wick disposed in 124.

Preferably atomizing wick and electronics 124 comprise a wick and heating wire provided to heat smoking fluid associated with the wick so as to generate smoke. Optionally atomizing wick and electronics 124 may comprise electronic and circuitry provided to control a heating wire.

Sensor module 126 may for example include at least one or more optional sensors for example flow sensors, smoke volume sensor, heat sensors, any combination thereof or the like preferably to control, gauge and/or the amount of smoke generated and/or consumed with atomizer 120. For example sensor module 126 may provide for identifying each puff produced, and/or identify inhalation of smoke.

Preferably tube connector 128 provides a connector outlet for connecting to a smoking user interface module 130 and in particular with smoking tube 132. Most preferably smoking tube 132 is provided as a flexible tube for conducting smoke generated from a smoking liquid with atomizer module 120 and received into tube 132 via connector 128. Preferably tube 132 provides for conducting the generated smoke from atomizer 120 to a user through mouthpiece 134. A user smokes through mouthpiece 134.

Optionally atomizer module 120 may be configured to be a single use or a limited use device that may be readily replaced. Optionally atomizer module 120 may be configured to be modular such that portions thereof may be readily replaced and/or configured as a single use device.

Optionally smoking UI 130 and particularly smoking tube 132 may be provided in the form of an elongated tube therein rendering electronic smoking device 110 in the form of an electronic hookah.

Optionally smoking tube 132 may be provided in the form of an elastic hollow tube having an open lumen on both ends, a first end coupled with tube connector 128 and second end coupled with mouthpiece 134.

Optionally smoking tube 132 may be provided in the form of a telescopic hollow tube. Optionally smoking tube 132 may be provided from inert materials conducive for conducting smoke, and biocompatible. Optionally smoking tube 132 may be provided from silicone.

Optionally smoking tube 132 may be a retractable flexible hollow tube. Optionally smoking tube 132 may be provided in the form of a retractable flexible hollow tube that may be disposed on a return reel or snap-back reel. Optionally length extracted from a retractable hollow tube may be controllable.

FIG. 1B shows an optional embodiment of system 50 as described with respect to FIG. 1B where case 102 is adapted to integrate at least a portion of smoking device 110, most preferably power module 114. Optionally case 102 may be adapted to integrate with power module 114 along a back portion and/or surface thereof.

Optionally case 102 may be adapted to integrate with atomizing module 120. Optionally case 102 may be configured to contain opening for accessing portion of atomizing module 120, for example to replenish a smoking fluid.

Figure 1C:
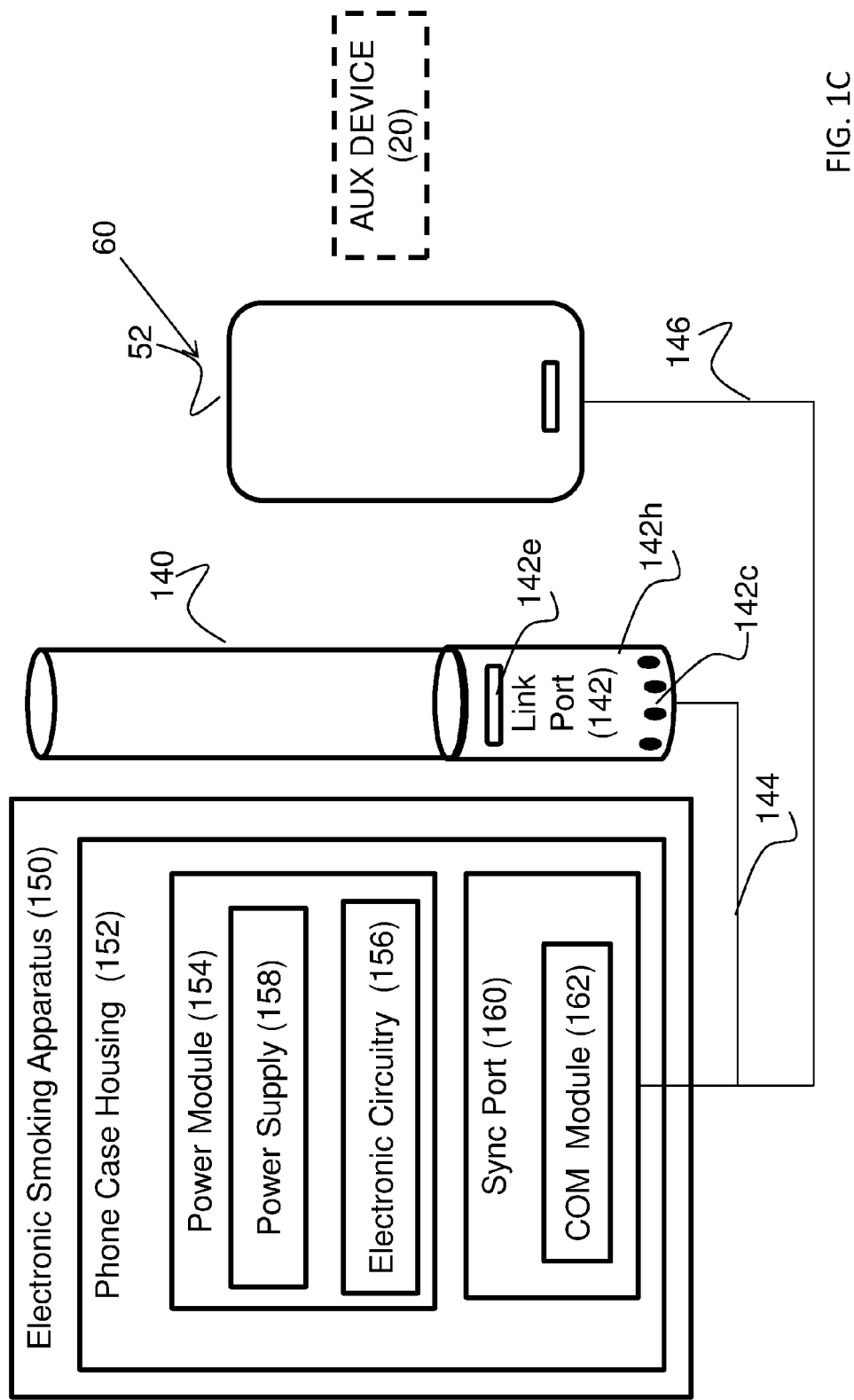

Now referring to FIG. 1C showing an optional embodiment of an electronic smoking system 60 comprising mobile device 52, an electronic cigarette 140 and electronic smoking apparatus 150. Optionally system 60 may further comprise auxiliary device 20, that functions as previously described.

Optionally device 52 may be in communication with an optional remote auxiliary device 20 provided for controlling functions associated with electronic smoking apparatus 150 and/or cigarette 140 associated with mobile communication device 52. Optionally auxiliary device 20 may be provided to limit and/or gauge and/or set a limit for the use of apparatus 100 and/or a smoking liquid associated with device 150 via mobile communication device 52. Optionally auxiliary device may 20 may communicate with and directly control electronic smoking apparatus 150 and/or cigarette 140 or any portions thereof.

Optionally auxiliary device 20 may be provided in the form of a server, computer, computer on a network, cloud computing facilities, or the like.

Optionally auxiliary device 20 may be a device associated with or form a part of a healthcare individual and/or organization for example including but not limited to a health care giver, health maintenance organization (HMO), hospital, healthcare organization, clinic, nursing station, physician, rehabilitation services, addiction centres, rehabilitation clinic, emergency care provides, ambulatory care providers, healthcare call centres, regulatory centres, government regulatory centres, CDC, FDA, or the like.

Optionally auxiliary device 20 may be a device associated with or form a part of a manufacturing organization and/or provider associated with the production and distribution of optional smoking fluids.

Optionally auxiliary device 20 or a portion thereof may be utilized as an authentication server to authenticate a user attempting to use smoking device 100. Optionally user authentication may be facilitated with auxiliary device 20 and may be performed via mobile communication device 52 utilizing at least one or more authentication methods for example including but not limited to username and password, biometric analysis, facial recognition, iris scan, fingerprint scan, voice recognition, the like or any combination thereof. For example, an auxiliary system 20 for example in the form of a regulatory body and/or government body, may comprise and/or utilize, a user authentication system via mobile phone 52 to grant a user permission to use smoking device 110 particularly when use of smoking device 110 is utilized for medicinal purposes using a medicinal smoking fluid for example using prescribed medical marijuana or the like medicinal smoking fluid, wherein most preferably authentication is required prior to consumption of the smoking fluid with smoking device 110. Optionally and preferably authentication via mobile phone 52 may be facilitated by utilizing internal functions of the phone 52 for example including but not limited to camera, microphone, touchscreen, display, scanning pad, speakers or the like.

Optionally authentication for use of smoking device 110 may be required only with particular smoking fluids, for example those requiring a prescription such as medical marijuana, once associated with smoking device 110. Optionally a smoking liquid contained within a container 56 may be equipped with identification, for example provided in the form selected from a chip, barcode, RFID, coded switch configuration or the like, where the identification may be read with apparatus 100 to trigger the authentication process utilizing auxiliary device 20 with the aid of the mobile device 52.

Mobile communication device 52 may for example be provided in the form of a mobile telephone, smart phone, tablet, min-tablet, PDA or the like mobile devices that provide processing, displaying and human interfacing capabilities and while optionally providing communication capabilities. Most preferably mobile communication device 52 is of the form that is readily mobile and may be associated and/or housed with a carrying case 152 that may optionally be decorative and/or protective in nature.

Optionally and preferably mobile communication device 52 may provide a user interface platform that facilitates the use and control of electronic smoking apparatus 150 and/or cigarette 140. Most preferably device 52 and smoking apparatus 150 are in communication with one another as shown with coupling and communication lines 146. Most preferably device 52 and e-cigarette 140 may be engaged in indirect communication facilitated with sync port 160 and link port 142, via communication lines 144, 146.

Optionally communication lines 146, 144 may be provided in the form of wired and/or wireless communication. Optionally wired communication and interfacing between device 52 and apparatus 150 may be facilitated with wired connectors facilitated with synchronization port 160. Optionally wireless communication between device 52 and apparatus 150 may be facilitated with wireless communication hardware, receiver/transceiver, and corresponding protocols disposed in each of device 52 and apparatus 150, for example about synchronization port 160. Optionally wireless communication may be provided in optional forms as is known in the art for example including but not limited to Wi-Fi, Bluetooth, Radio Frequency (RF), Near Filed Communication (NFC), proximity communication, optical communication, Infrared (IR), optical communication, ultrasound, any combination thereof or the like.

Optionally mobile communication device 52 may facilitate the use and control of electronic smoking apparatus 150 and cigarette 140 for example with a dedicated software application ('APP') running on device 52 that provides for operating and controlling smoking apparatus 150 and/or cigarette 140, via linking port 142. Optionally such a dedicated APP may provide for a plurality of optional activities associated with apparatus 150 and/or cigarette 140 for example including but not limited to: gauging use of apparatus 150 and/or cigarette 140, controlling functions of apparatus 150 and/or device 140, interfacing and/communicating with a dedicated social network relating to the use of apparatus 150 and/or cigarette 140, interfacing and/or communicating with optional social networks information relating to a user using apparatus 150 and/or cigarette 140, gauging consumption of goods associated with cigarette 140, limiting the use of cigarette 140, time based activation of cigarette 140, remotely controlling of apparatus 150 and/or cigarette 140 with an optional auxiliary devices 20 in communication with device 52, any combination thereof or the like.

Smoking apparatus 150 comprises a mobile telephone case 152, the case integrated and/or securely associated with a power supply module 154 and a synchronization module 160.

Most preferably case 152 comprises a housing for securely receiving, holding mobile device 52 and electronic cigarette 140. Optionally and preferably the housing of case 152 is configured about at least one portion thereof to have a dedicated recess and/or housing for individually receiving mobile device 52 and cigarette 140.

Electric cigarette 140 includes the components of an electronic cigarette including an atomizer and wick, at least one liquid smoking fluid housing, local power supply and circuitry and is further equipped with a proprietary linking port 142.

Optionally e-cigarette 140 may comprise at least one or more liquid smoking fluid housings to include at least one smoking liquid. Optionally e-cigarette 140 may comprise at least two or more smoking liquids that may be arranged as a primary smoking liquid and a secondary smoking liquid. Optionally e-cigarette 140 may be adapted to receive at least one or more smoking liquid cartridges 56, as previously described.

Optionally linking port 142 may be provided as a stand-alone device that may be rendered functional when coupled to an optional off the shelf electronic cigarette.

Linking port preferably comprises a housing 142h, electronic contacts 142c and electronic circuitry 142e to facilitate coupling and association with a synchronization port 160 provided on apparatus 150.

Preferably housing 142h may be configured to allow for the seamless and automatic association and coupling between sync port 160 and link port 142. Optionally housing 142h may be provided in the form of an automatically retractable housing configured to reveal and/or expose contacts 142c to allow for seamless and automatic coupling with corresponding electronic contacts disposed on port 160.

Preferably link port 142 comprise electronics circuitry 142e provided to facilitated communication with at least one of sync port 160, mobile device 52, auxiliary device 20. Optionally circuitry 142e may be provided with communication capabilities, for example including a receiver/transmitter (Rx/Tx) circuitry, to enable cigarette 140 with optional communication capabilities. Optionally circuitry 142e may provide for optional communication capabilities for example including but not limited to contactless, wireless, wired, communication, as is known in the art for example in the form of Bluetooth, NFC, RF, or the like.

Optionally port 142, for example via electronic circuitry 142e, may provide for sensing, gauging and/or controlling the use of electronic cigarette 140.

Synchronization port 160 preferably comprises a communication module 162 provided for facilitating and synchronizing communication between cigarette 140, particularly port 142, and mobile device 52. Optionally port 160 may be in communication with auxiliary device 20, optionally indirectly via mobile device 52 or directly utilizing communication module 160.

Optionally module 160 and communication module 162 may be provided with communication capabilities, for example including a receiver/transmitter (Rx/Tx). Optionally module 162 may provide for optional communication capabilities for example including but not limited to contactless, wireless, wired, communication, as is known in the art for example in the form of Bluetooth, NFC, RF, or the like.

Optionally and preferably control of cigarette 140 may be rendered via module 160.

Case 152 is preferably integrated with a power module 154 comprising electronic circuitry 156 and power supply 158. Optionally electronic circuitry 156 may be provided in the form of a PCB board and/or the like circuitry to render module 154 functional. Optionally and preferably power module 154 provides the primary power source for electronic cigarette 140 and synchronization port 160, and as a backup power source for mobile device 52. Optionally an internal battery disposed in cigarette 140 may be replenished via power module 154.

Preferably circuitry 156 provides for controlling power supply 158. Preferably power supply is provided in the form of at least one or more battery. Optionally power supply 158 may be provided in the form of a rechargeable battery as is known in the art. Optionally for power supply 158 may be provided in the form of a capacitor, super-capacitor or the like power storing device.

Now referring to FIGS. 2-6 showing various views of system 50 previously described in FIG. 1A-B.

FIG. 2A-D show optional perspective views of system 50, including a mobile telephone 52 and carrying case 102 forming an integral part of electronic smoking apparatus 100. FIG. 2A shows a perspective front view of an optional case 102 in a perspective view. FIG. 2B shows a perspective back view of case 102 showing atomizer module 120. Optionally atomizer 120 may be associated and disassociated from apparatus 100 via the opening disposed on the back portion of case 102.

Optionally module 120 may be removed in order to replenish a smoking fluid, change a wick and wire or the like. Optionally module 120 or portions thereof may be provided in disposable forms so as to allow quick and easy replenishments of wick and heating wire and/or smoking fluid.

FIG. 2C shows case 102 in its open configuration revealing mobile device 52, while smoking user interface module 130 remains unseen behind a housing front member 112f.

FIG. 2D provides an end view of apparatus 100 revealing smoking UI module 130, particularly mouthpiece 134 and smoking tube 132. FIG. 2D also reveals connector 114c utilized to couple power module 114 with mobile phone 52 in a wired format.

FIG. 3A-C provide various exploded views of system 50, particularly apparatus 100. FIG. 3A shows an exploded view of system 50, described in FIG. 1A. System 50 comprises mobile phone 52 and apparatus 100 including front housing 112f, atomizer module 120, power module 114, smoking user interface module 130, back housing 112b and case 102.

Optionally front housing 112f may be provided with the necessary couplers and/or holders for securely associating housing 112 with mobile device 52. Optionally case 102 is coupled and/or associated with back housing 112b. Optionally housing 112 along both the back portion 112b and/or front portion 112f may be adapted to facilitate and/or accommodate case 102.

FIG. 3B-C provides a further close up exploded view of smoking apparatus 110 revealing an optional arrangement thereof. User interface module 130 comprising mouthpiece 134 and a flexible smoking conducting tube 132 is shown. Smoke conducting tube 132, as previously described, may be provided from flexible materials that allow for conducting smoke from atomizer 120 to user through mouthpiece 134. Smoke conducting tube 132 provides a smoking experience similar to that of a hookah.

Tube 132 is preferably flexible in nature and may be looped within housing 112 when it is stowed. Optionally housing 112 about either front 112f or back 112b sides may be fit with a smoking tube holder to facilitate such looping.

FIG. 3C provides a further exploded view showing atomizing module 120 that is separated from power module 114. Optionally and preferably atomizer 120 may be provided in disposable form, as previously described. Optionally atomizer 120 is rendered function when coupled with power module 114 via atomizer connector 124c, that is provided to couple with power module connector 116c (not shown).

Preferably atomizer 120 provides for creating smoke from a smoking fluid the generated smoke is conducted to tube 132 via connector 128.

Figure 4A:
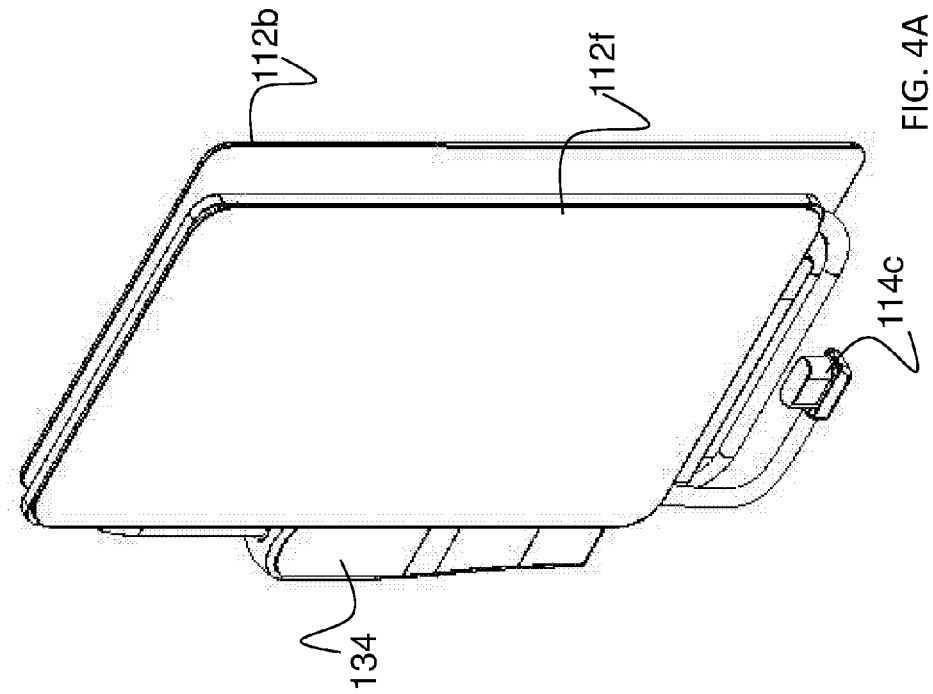
FIG. 4A-B are schematic illustrative diagrams of a portion of an optional electronic smoking system according to the present invention.
Figure 4B:
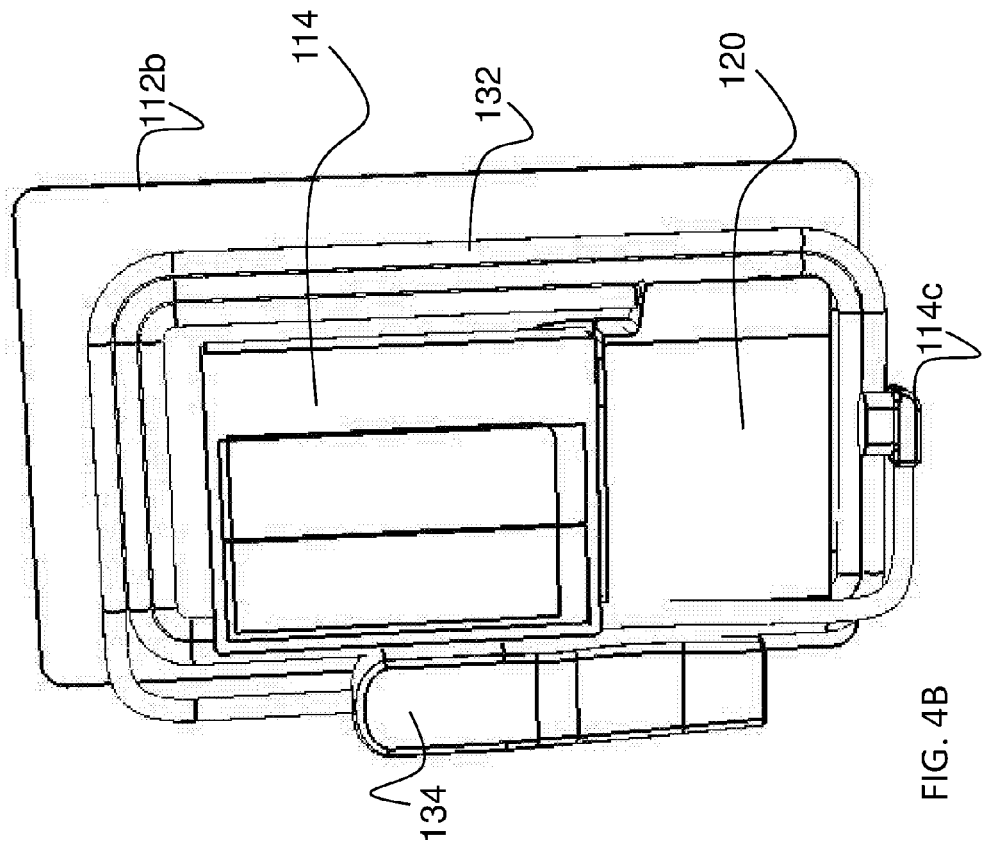

FIG. 4A shows the assembled smoking device 110 within housing 112 as it may be coupled with case 102. FIG. 4B shows the same view however with front housing portion 112*f* removed.

Figure 5A:
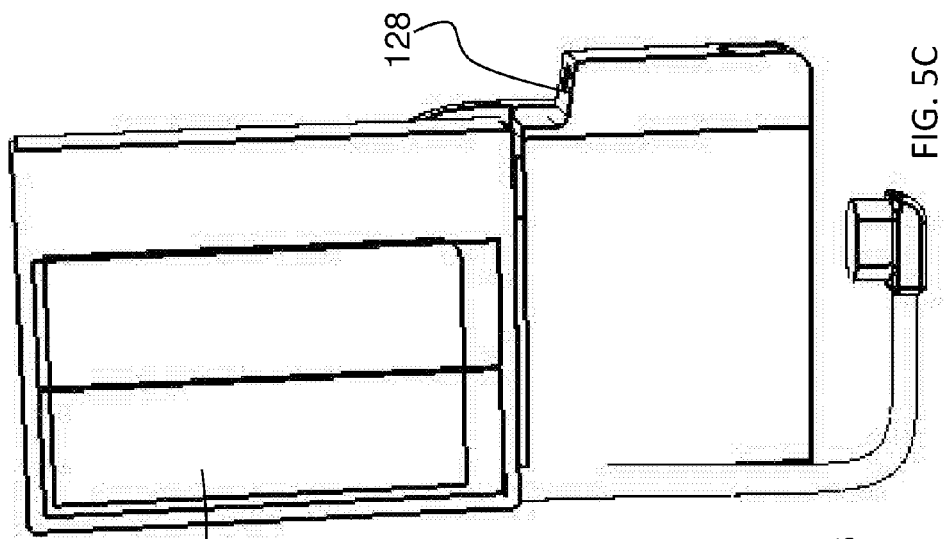
FIG. 5A-C are schematic illustrative diagrams of a portion of an optional according to the present invention.
Figure 5B:
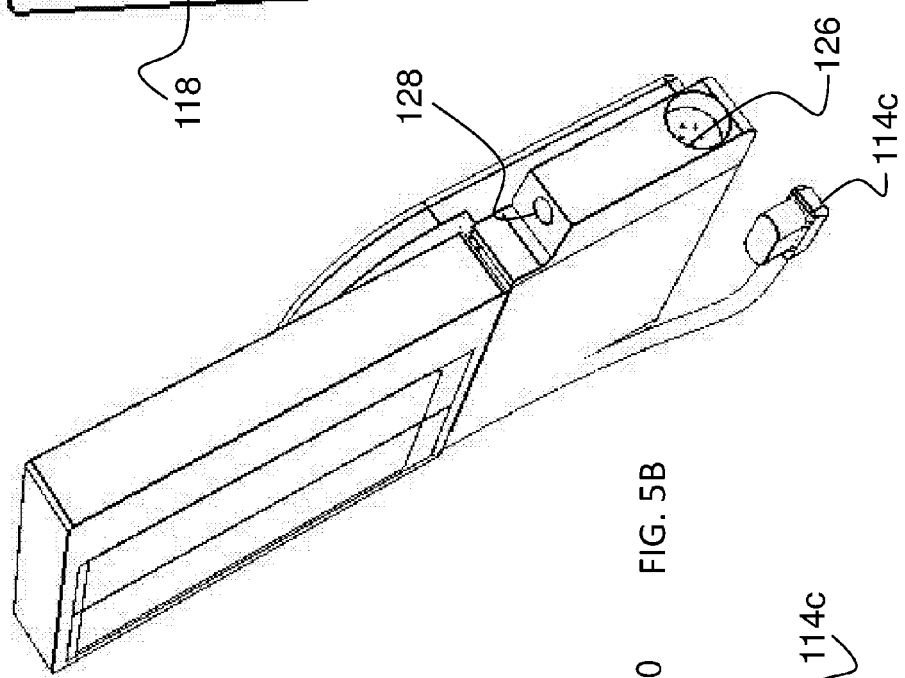
Figure 5C:
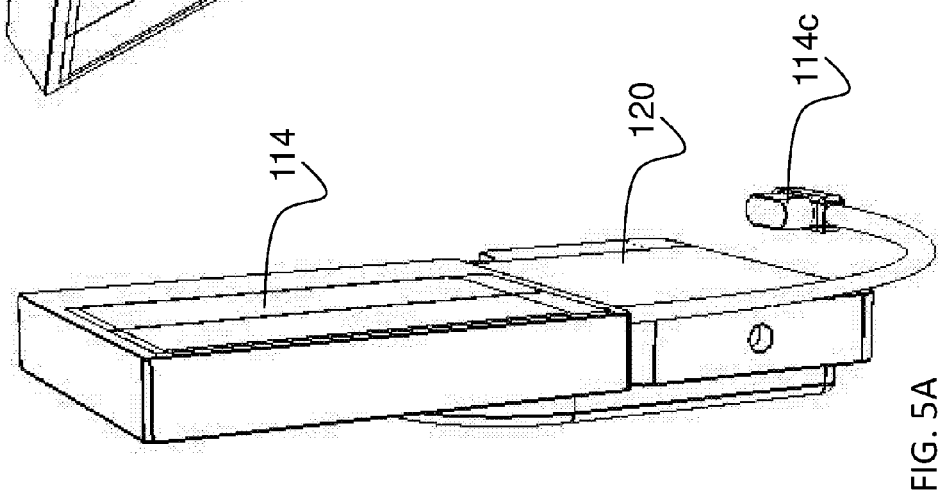

FIG. 5A-C shows optional perspective views of the heart of the heart of smoking device 110 including atomizer 120 and power module 114. FIG. 5A shows a side view of atomizer 120 and power module 114 coupled about contacts 116*c* and 124*c* (not shown). FIG. 5A shows connector 114*c* provided to connect between mobile device 52 and power module 114. Connector 114*c* preferably extends with a wire from power module 114 having a connector plug type corresponding to the type of mobile device 52 utilized.

FIG. 5B shows a closer view off smoking tube connector 128 and sensor 126, as previously described. Similarly, FIG. 5C shows a further front view showing power supply 118, shown in the form of rechargeable batteries.

FIG. 6A shows a close up view of power module 114 showing electronic circuitry 116 and connector 116*c*, as previously described.

FIG. 6B shows a close up view of atomizer module 120 revealing smoking fluid housing 122, atomizing wick and electronics 124 and atomizing connector 124*c*, as previously described.

Optionally module 120 may be provided with a housing 120*h* that allows portions for atomizer 120 to be replaced and/or removed. Optionally and preferably housing 120*h* facilitates disassociating of module 120 from power module 114.

Now referring to FIG. 7A-G showing various views of system 60 previously described with respect to in FIG. 1C.

FIG. 7A-B show an optional embodiment of system 60 utilizing cigarette 140 having a linking port 142 provided in the form of pen holder and configured to associate with a sync port 160 integrated with a mobile case holder 152. Preferably when cigarette 140 is associated with case 152 via port 160 and link port 142 allows a dedicated APP running on device 52 to interface with cigarette 140. Optionally such interfacing allows for data sharing, power sharing and communication.

Preferably link port 142 comprises a specialized housing for seamlessly coupling and associating with sync port 160, as previously described.

Optionally link port 142 and sync port 160 may be coupled by way of induction, with a female to male connection ports, for example as shown link port 142 assumes a male connector configuration while sync port 160 assumes a female connector configuration.

FIG. 7C shows an optional embodiment for case 152 wherein sync port is disposed along the back face of case 152. Optionally and preferably coupling port 142 with sync port 160 provides for seamless an automatic coupling of the corresponding electrical contacts to facilitate and allow immediate data sharing, communication and interfacing between mobile device 52 and cigarette 140.

FIG. 7D-G shows optional embodiments and configuration of case 152 in particular relating to the location and orientation of sync port 160 along the difference edges and faces of case 152. Most preferably all configurations allow for seamless and automatic communication and interfacing between link port 142 and sync port 160.

FIG. 8A-E shows an optional embodiment of system 60 including electronic cigarette 140, FIG. 8A, and case 152, FIG. 8B-E. FIG. 8A shows electronic cigarette 140 featuring linking port 142 at an end thereof. As previously described linking port 142 provides for automatically and seamlessly linking with case 152 with a corresponding synchronization port 160.

FIG. 8B-E shows various views of case 152 similar to that depicted in FIG. 7C. FIG. 8B shows a perspective side view of case 152 revealing a front phone recess 152*p* provided for receiving a mobile communication device 52; and a back cigarette recess 152*c* provided for receiving electronic cigarette 140, FIG. 8A. FIG. 8C shows a back view of case 152 featuring a cigarette recess 152*c* as shown having an open end configured to receive an end of e-cigarette 140 most preferably end 142.

FIG. 8D shows cross sectional view across case 152. The view provided by FIG. 8D reveals the open recess 152*c* and power module 154 embedded within case 152. As shown front phone recess 152*p* is configured to receive and securely associate with a mobile communication device 52, as shown.

FIG. 8E shows a longitudinal cross sectional view of case 152. The view provided by FIG. 8E shows the length of cigarette recess 152*c*, power module 154 and synchronization port 160. Most preferably cigarette 140 may be associated with case 152 by entering recess 152*c* so as to allow linking port 142 to seamlessly couple and/or associate with synchronization port 160 and power module 154.

The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Further modifications of the invention will also occur to persons skilled in the art and all such are deemed to fall within the scope of the invention as defined by the appended claims.

What is claimed is:

1. An electronic smoking system comprising: a mobile telephone carrying case (152) adapted to receive both an electronic cigarette (140) and a mobile communication device (52); characterized in that said carrying case is integrated with a synchronization port (160) provided for interfacing between said electronic cigarette and said mobile communication device; said electronic cigarette including a linking port (142) configured to seamlessly and automatically associate and align with said synchronization port (160).

2. The electronic smoking system of claim 1 wherein said fluid source is provided in a form selected from the group selected from: a liquid form, a powdered form, a medicament, a mixture comprising nicotine replacement agent, a mixture comprising nicotine, mixture comprising medicinal marijuana.

3. The electronic smoking system of claim 1 further comprising at least one sensor selected from the group consisting of: temperature sensor, electronic resistance sensor, flow sensor, airflow sensor.

4. The system of claim 1 wherein said synchronization port provides for interfacing data and for power sharing between said mobile communication device and said electronic cigarette.

5. The system of claim 4 wherein interfacing data utilizes Bluetooth communication protocol.

6. The electronic smoking system of claim 1 wherein said ports are functionally coupled with a battery source integrated within said carrying case.

7. The electronic smoking system of claim 6 wherein said battery is provided to replenish power for at least one of said electronic cigarette and said mobile communication device.

8. The system of claim 1 wherein said synchronization port and said linking port are provided in the form of a proximity induction ports that seamlessly and automatically associate with one another.

9. The system of claim 8 wherein said induction ports are configured such that said linking port is provided in the form of male induction port and said synchronization port is provided in the form of a corresponding female induction port.

10. The system of claim 8 wherein said induction ports are configured such that said linking port is provided in the form of a female induction port and said synchronization port is provided in the form of a corresponding male induction port.

11. The electronic smoking system of claim 1 wherein said fluid source (56) provided in the form of cartridge containing a smoking liquid further comprises an identification for identifying said smoking liquid or components thereof; and wherein said identification is readable with at least one of said mobile communication device or said carrying case.

12. The system of claim 11 wherein said identification is provided in the form selected from the group consisting of: chip, barcode, RFID, coded switch configuration, any combination thereof.

13. The electronic smoking system of claim 11 wherein said fluid source (56) provided in the form of cartridge that is configured one selected from the group consisting of: single use, multi-use, or limited use.

14. The electronic smoking system of claim 1 wherein said mobile telephone controls said electronic smoking device (110).

15. The electronic smoking system of claim 14 wherein said control is provided via a software application (APP) running on said mobile telephone (52).

16. The electronic smoking system of claim 15 wherein said software application provides for monitoring use of said electronic smoking device (110) and the consumption of a smoking fluid.

17. The electronic smoking system of claim 15 wherein said software application provides for limiting use of said electronic smoking device (110).

18. The electronic smoking system of claim 17 wherein said software application provides for limiting use of said electronic smoking device (110) according to at least one selected from the group consisting of: a schedule, accumulated use, level of consumption of smoking fluid.

19. The system of claim 1 wherein said synchronization port (160) and said linking port (142) include corresponding electrical contacts that seamlessly and automatically associate with one another.

20. The system of claim 19 wherein said linking port is disposed within a housing configured to provide for said seamlessly and automatically associating with said synchronization port, wherein said linking port housing is configured to reveal said electrical contacts and couple said contacts with corresponding contacts disposed in said synchronization port.

21. The system of claim 19 wherein said synchronization port is provided within a specialized housing configuration that provides for associating between said electronic cigarette in a uni-directional manner, said uni-directional association provides for the automatic association of said synchronization port with said linking port.

22. The system of claim 21 wherein said uni-directional association reveals electrical contacts on said linking port to allow for automatic coupling with corresponding electrical contacts on said synchronization port.

23. The system of claim 1 further interfacing with an auxiliary device (20) in the form of a remote authentication server provided to authenticate a user requesting to use the electronic smoking device; wherein the mobile communication device (52) is utilized to obtain user specific identification signals; wherein said auxiliary device (20) utilizes said user-specific identification signals to authenticate the user and to grant permission for using said electronic smoking device.

24. The system of claim 23 wherein said auxiliary device (20) is provided in form of a computer selected from the group consisting of: a server, computer, computer on a network, cloud computing facilities; and wherein said computer is controlled by an individual associated with at least one authenticating organization selected from the group consisting of: a healthcare provider, health care giver, health maintenance organization (HMO), hospital, healthcare organization, clinic, nurse, nursing station, pharmacist, physician, rehabilitation services, addiction centres, rehabilitation clinic, emergency care provides, ambulatory care providers, healthcare call centres, regulatory centres, government regulatory centres, CDC, FDA.

25. The device of claim 23 wherein said user specific identification signals are provided from intrinsic functions of said mobile communication device (52) selected from the group consisting of camera, microphone, touchscreen, display, scanning pad, speakers or the like.

26. The system of claim 23 wherein said authentication is provided with at least one or more selected from the group consisting of: username and password, biometric analysis, facial recognition, iris scan, fingerprint scan, voice recognition, or any combination thereof.

27. The system of claim 23 wherein said auxiliary device is used to authenticate use of a prescription smoking fluid.

28. The system of claim 27 wherein said prescription smoking fluid is medicinal marijuana.

29. A carrying case (152) provided for receiving and housing a mobile communication device (52) and an electronic smoking device (140), the case having a front side extending from a back side;
   a) wherein said front side defines frame-like central recess (152p) provided for receiving and securely coupling with said mobile communication device (52) such that device (52) is rendered fully functional within said frame-like recess (152p);
   b) said back side having a continuous surface adapted to internally house electronics including a power source module (154) and a synchronization port (160); wherein said electronics are configured to be in communication and functional with said mobile communication device (52) and to further interface with an electronic smoking device (140);
   c) said case having a longitudinal recess (152c) disposed along at least a portion of its length configured to receive at least a portion of an electronic cigarette (140) and wherein said recess (152c) includes electronic contacts extending from said synchronization port (160) and configured to functionally couple with corresponding contacts disposed on at least a portion of electronic cigarette (140).

30. The case of claim 29 wherein said longitudinal recess (152c) is disposed along one surface selected from: said back surface, a side surface coupling said front side and back side.

31. The case of claim 29 wherein said synchronization port (160) is adapted to interface between an electronic smoking device (140) and said mobile communication device (52).

32. The case of claim 31 wherein said synchronization port (160) is in functional wired communication with both said mobile communication device (52) and said electronic smoking device (140) when said smoking device is docked within said longitudinal recess (152c).

33. The case of claim 31 wherein said synchronization port (160) is in functional wired communication with said mobile communication device (52); and in functional wireless communication with said electronic smoking device (140).

* * * * *